United States Patent [19]
Sher

[11] Patent Number: 5,160,104
[45] Date of Patent: Nov. 3, 1992

[54] VERTICALLY ADJUSTABLE HOLDER

[76] Inventor: Joseph M. Sher, 6161 NW. 57 Ct., #309, Tamarac, Fla. 33319

[21] Appl. No.: 564,767

[22] Filed: Aug. 8, 1990

Related U.S. Application Data

[63] Continuation-in-part of Ser. No. 260,244, Oct. 20, 1988, Pat. No. 5,039,044.

[51] Int. Cl.⁵ ............................................. F16M 11/00
[52] U.S. Cl. .................................. 248/176; 248/125; 248/295.1; 108/96
[58] Field of Search .............. 248/127, 126, 125, 124, 248/918, 176, 316.4, 295.1; 108/96, 144, 148, 53.5; 211/27

[56] References Cited

U.S. PATENT DOCUMENTS

| | | | |
|---|---|---|---|
| 134,273 | 12/1872 | Hanford | 108/144 X |
| 848,991 | 4/1907 | Harvey | 108/148 |
| 3,510,131 | 5/1970 | Gardner | 248/163.1 |
| 4,635,565 | 1/1987 | Novak | 108/144 X |
| 4,651,652 | 3/1987 | Wyckoff | 108/144 |
| 4,895,381 | 1/1990 | Farlow | 108/148 X |
| 4,948,076 | 8/1990 | Sumsell | 248/125 |

FOREIGN PATENT DOCUMENTS

| | | | |
|---|---|---|---|
| 1070723 | 8/1954 | France | 108/53.5 |
| 1089837 | 3/1955 | France | 108/148 |
| 627398 | 8/1949 | United Kingdom | 211/43 |

*Primary Examiner*—Alvin C. Chin-Shue
*Attorney, Agent, or Firm*—Rodger H. Flagg

[57] ABSTRACT

A vertically adjustable holder for securing at least one item, such as a video cassette recorder (VCR), above a television set, or for securing above a video monitor at least one article, such as a printer. It is of knockdown construction for economy of storage and transport. The holder includes: a flat base that fits underneath the television set or video monitor, vertical member means for vertical adjustability, and a horizontal platform located above the television set or video monitor, upon which at least one item is held. Each vertical member means includes a lower piece and an upper piece. Vertical adjustment may be achieved by a telescoping action of each lower piece with its respective upper piece, or by the use of at least one sleeve that is affixed to the lower (upper) piece and through which the upper (lower) piece engages with a close sliding fit. In other disclosed embodiments, a vertical assembly is comprised of at least one lower vertical element attached to a base, a horizontal element connected to the lower vertical element, and an upper vertical element connected to the horizontal element and extending upward from the horizontal element. The platform has at least one upper vertical-element-engaging means in which the platform vertically adjusts on the vertical element.

4 Claims, 4 Drawing Sheets

VERTICALLY ADJUSTABLE HOLDER

This invention disclosure is a continuation in part of co-pending patent application having Ser. No. 07/260,244, and filed Oct. 20, 1988, now U.S. Pat. No. 5,039,044, issued Aug. 13, 1991.

BACKGROUND OF THE INVENTION

This invention relates to support stands and more particularly to a knockdown, vertically adjustable support for holding one or more items such as a video cassette recorder (VCR) or video cassette player above a television set. The invention can also be utilized for holding items such as a computer printer, computer diskettes, or user manuals, above a video monitor when employed with a microcomputer or computer terminal.

A VCR has become a popular accessory for use with a television set. The location most suitable for its operation is often above the television set for a variety of reasons: By being situated above the set, the VCR may be handled without bending. Adequate height may allow easier operation of the infrared remote control by avoiding obstructions that are often present when the VCR is too close to the floor. In addition, the space above the television is often not utilized. By placing the VCR there, space elsewhere can be used for other purposes.

In many cases, the top surface of the television set lacks the depth to securely hold a VCR. When placed there, the VCR may protrude over the front and/or rear of the television set. These protrusions may be considered cosmetically unappealing. In some situations, the narrow television top may not even be secure enough to handle the force of pushing a cassette into a VCR. Generally, vendors of VCR's and furniture retailers sell cabinets or "entertainment centers" with a plurality of shelves that avoid these problems. However, they are typically expensive, bulky, and sometimes impair ventilation of the equipment. The top of many computer video monitors also have a limited amount of flat horizontal surface area. A large sturdy surface above a video monitor could accommodate articles such as a printer, computer diskettes, or user manuals.

SUMMARY OF THE INVENTION

It is accordingly an object of the invention to provide a sturdy and sufficiently large surface for holding one or more items (such as a VCR or video cassette storage cabinet) above an object, such as a video screen component (eg. television or video monitor), whereby the invention will be inexpensive, knock down to a small package for transport and storage, be easy to assemble and use, adjust to fit a particular object, and will ensure adequate ventilation if heat is being dissipated.

When used in conjunction with a television set, the invention includes a base means that it sandwiched by a sturdy support surface below it and a television set above it to securely anchor the assembly; at least one vertical member means, wherein each vertical member means includes a lower piece which is connected to the base means and extends upward from the base means, and an upper piece which is connected to an item supporting horizontal platform means and extends downward from the platform means; vertical adjustment is achieved by movement of the upper piece with respect to the lower piece. This movement can be accomplished by a telescoping action of each lower piece with its respective upper piece (as described in Disclosure Document No. 247329), or by the use of at least one sleeve or channel that is affixed to the lower (upper) vertical piece and through which the upper (lower) vertical piece engages with a close sliding fit (as described in Disclosure Document No. 248994). The horizontal platform means is of a size sufficient to hold a VCR or other item(s) of interest. The platform means may be held in place by the gripping of the upper piece against the lower piece (in the case of telescoping action) or upper (lower) piece against sleeve(s). Gripping results from the weights of the platform means and the item that rests on it. The platform means may be vertically adjusted until it rests upon the top of the television set for most stable operation.

For a telescoping action, the vertical member means may be made of metal or plastic tubing or pipe (possibly extruded), whereby the telescoping is achieved by having the inside diameter of the outer piece just slightly greater than the outside diameter of the inside piece.

In Disclosure Document No. 255543, I describe an alternative upper piece of a vertical member means consisting of a bent or curved rigid strap that has an "S" shape. The top most portion of the strap is flat and can be bolted to the bottom of a platform. There are two through holes in the strap (punched or molded) that are vertically aligned through which the lower piece of the vertical member means engage with a close sliding fit.

The base means may be the top portion of a television pedestal stand, television cart, chest of drawers, or other structures that support a television. In these cases, a part of the connecting means to the vertical member means must be built into the top portion of the television support structures (such as a threaded insert which receives a hangar bolt affixed to the bottom end of the vertical member means). More typically, the base means will be comprised of one or more pieces that rest upon such television support structures, whereby the base means is sandwiched by the television support structure below it and the television set above it.

The base means may have at least one movable component that provides horizontal adjustment to accommodate television sets (or other objects) of different dimensions and to vary the position where the vertical members connect with the base means so that the vertical member means is clear of any obstructions.

The primary advantage of the aforementioned embodiments disclosed herein over the subject matter in my parent patent application is that the vertical member means do not extend above the horizontal platform. As such, the upper surface of the platform means is not obstructed by the vertical member means. In practice, the vertical member means (based on my parent application) would be far enough to the rear and close enough together (if more than one vertical member was utilized) so that the VCR or other item would block the vertical members from sight (when viewed from the front of the apparatus). For those vertical member means of the embodiments described herein that do not extend above the platform means, it is not necessary to place them far to the rear; the vertical members may be placed wider apart from each other and closer to the sides of the television set.

Some television manufacturers produce models that have wide and rounded rear protuberances (which enclose the picture gun) that require the vertical members to be placed wide apart (if two of them are utilized and placed on opposite sides of the rear protuberance). In the parent application, the item supporting horizontal platform includes vertical member engaging aperture means. The aperture means have dimensions that provide a close vertical sliding fit on vertical member means for height adjustment. As previously stated, the vertical member means would extend above the platform. If two vertical members are utilized, and are on opposite sides of the rear protuberance, then it is desirable to place them in the rear portion and close together so that the VCR or other item would block them from sight, when viewing the television from the front. I have also included in this disclosure another embodiment which utilizes a platform having vertical member engaging aperture means. The embodiment also includes a vertical assembly means whereby the lower vertical elements of the assembly are connected to the base means far apart from each other (on opposite sides of the rear protuberance of the television set), a horizontal element connects the two lower vertical elements and lies above the protuberance, and upper vertical elements are connected to the horizontal element and extend upward therefrom. These upper elements are spaced sufficiently close together so that an item resting on the platform could block the upper elements from sight, when viewing from the front of the television. The upper vertical elements engage the aperture means of the platform with a sliding fit for height adjustment of the platform, and grip the platform at certain angles. Gripping is enhanced by weight upon the platform. Inserts may also be utilized to provide a closer fit of each upper vertical element with the platform (as discussed in Disclosure Document No. 257107).

The foregoing embodiments disclosed herein also have the potential advantage that the depth of the base means (i.e the dimension from the front to rear of the television set) may not need to be as great as with those embodiments disclosed in my parent patent application, if it is desired that the vertical members are not to extend above the platform or are to be hidden from site.

As stated above, the invention may also be utilized with a video monitor in conjunction with a microcomputer or computer terminal. Often a computer video monitor rests upon the upper surface of a metal or plastic computer case that houses the microprocessor and disk drives. This housing rests upon a sturdy surface such as a table. The base means of the invention may either be sandwiched between the table and the housing, or between the top of the housing and the video monitor. The holder's platform means is placed above the top of the video monitor. The platform may require spacing legs to allow ventilation of the monitor.

The objects, advantages, and features of the invention will become more fully apparent when the following detailed description of preferred embodiments of the invention are read in conjunction with the accompanying drawings.

DETAILED DESCRIPTION OF PREFERRED EMBODIMENTS

Figure 1:
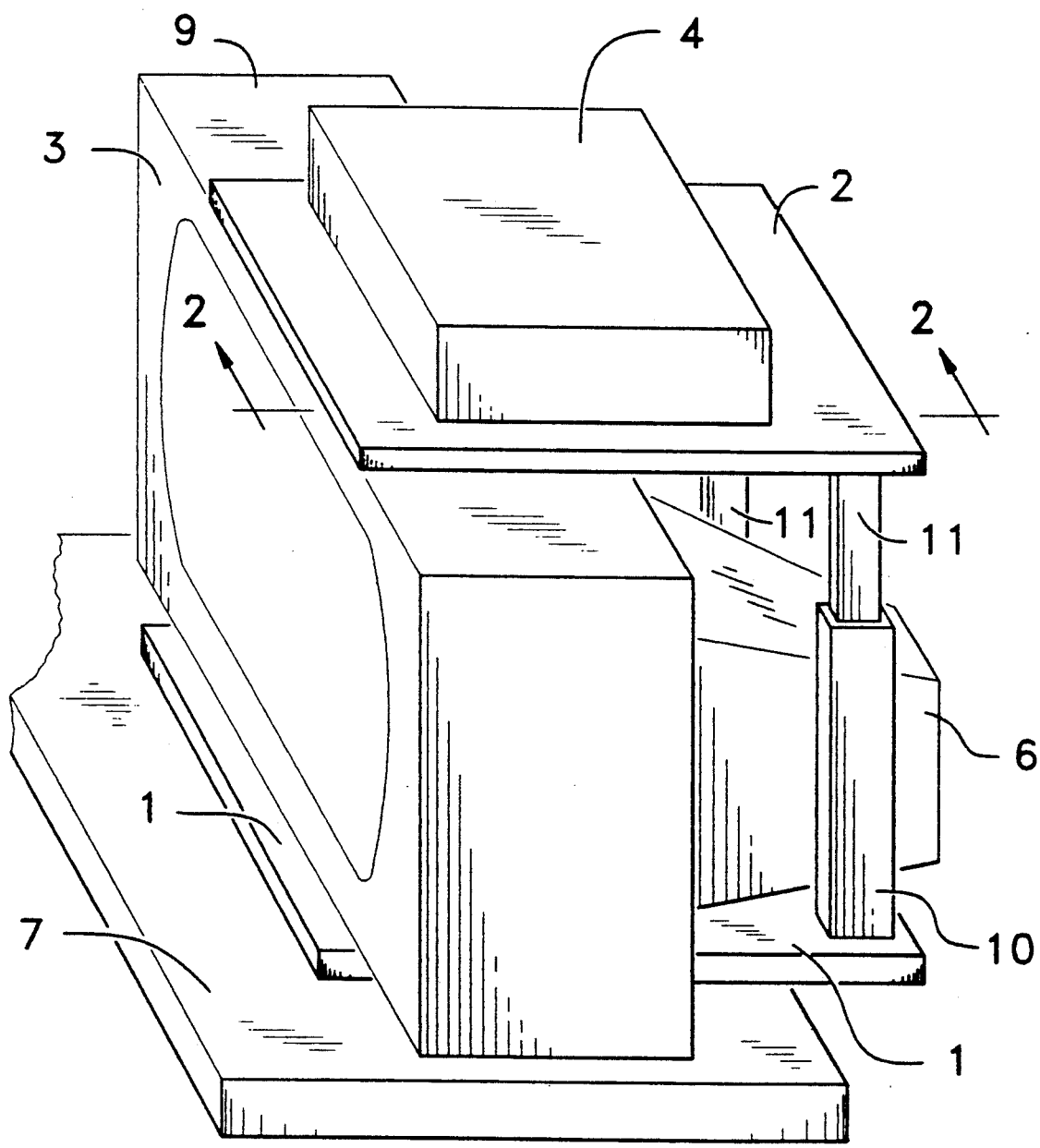
FIG. 1 is a perspective view of the invention in use which utilizes telescoping vertical member means.
Figure 2:
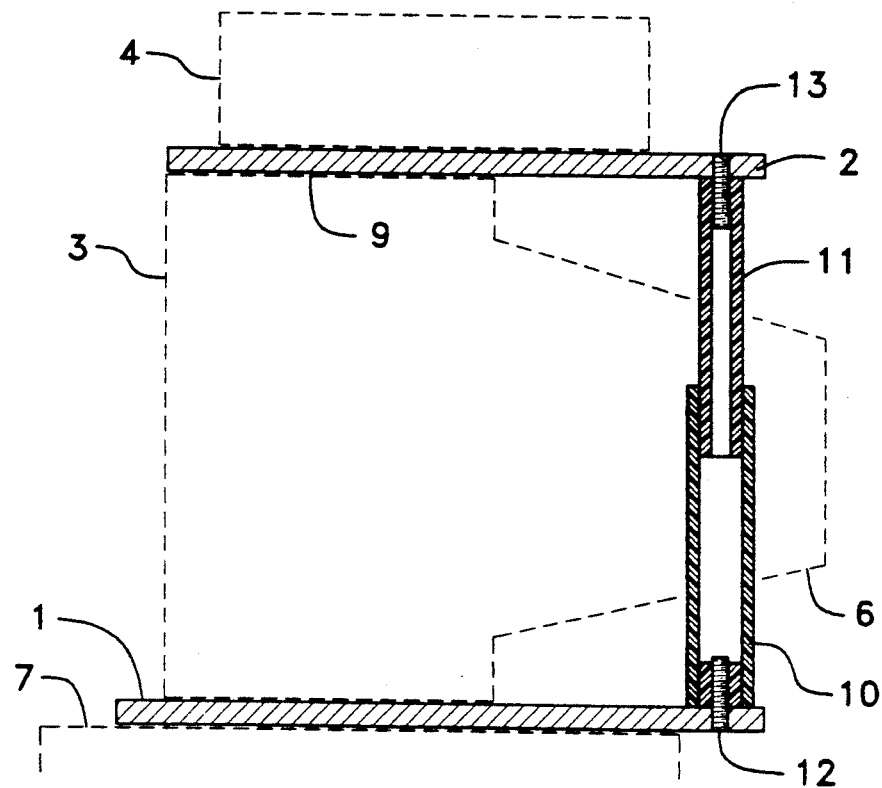
FIG. 2 is a cross sectional view through 2—2 of FIG. 1.

Referring now first to FIGS. 1 and FIGS. 2 showing the holder in use with the VCR 4, television set 3 and table 7 (shown in phantom in FIG. 2), the holder comprises a base 1 that rests upon a table or other suitable surface. The television set 3 rests upon the flat, planar base 1, thereby securely fixing the base and the holder in place by the weight of the television set.

A pair of lower pieces 10 of vertical members are attached to the base 1 by bolts 12 (FIG. 2). These lower pieces 10 are attached near the rear corners of the base so that they are behind the widest dimension of the television set and straddle the central protuberance 6 that extends behind the television set and contains the gun of the picture tube. The corresponding upper pieces 11 of the vertical members are attached to the horizontal platform 2 by bolts 13, and telescope with their respective lower pieces 10. Both the lower pieces 10 and their corresponding upper pieces 11 are shown with a rectangular cross-section in FIG. 1. The vertical members are hardly noticeable when viewing from the front of the television.

The holder is preferably transported in knock-down or disassembled form. The lower pieces 10 of the vertical members are bolted to the base 1 by bolts 12 (FIG. 2), or other fastening means well known in the art of knock-down furniture. The upper pieces 11 of the vertical members are similarly bolted to the bottom of platform 2. The base 1 is positioned on the table 7 and the television set 3 is placed on the base as shown. The horizontal platform 2 is raised above the television set 3 and the upper pieces 11 of the vertical members are aligned with their respective lower pieces 10 and telescoped downward until the bottom of platform 2 is at, or close to, the upper surface 9 of television set 3. The VCR 4 is then placed upon the upper surface of platform 2 which may be provided with a frictional surface to prevent sliding.

Figure 3:
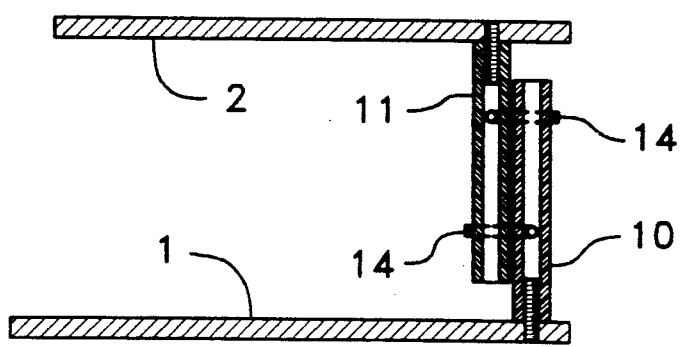
FIG. 3 is a cross sectional view as in FIG. 2 of an embodiment with one sleeve affixed to the lower piece of a vertical member means, and another sleeve attached to the upper piece of said vertical member means.
Figure 4:
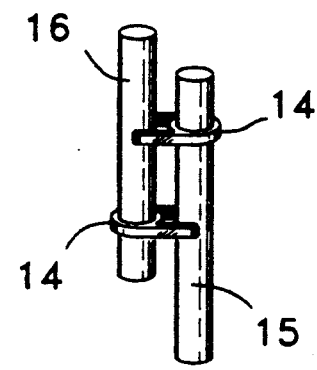
FIG. 4 is a perspective view of vertical member means of FIG. 3.

The alternative embodiment illustrated in FIG. 3 shows a cross sectional view of a sleeve 14 affixed to a lower piece 10 of a vertical member, and a sleeve 14 affixed to an upper piece 11 of said vertical member, which allows height adjustment. FIG. 4 shows a perspective view of a lower piece 15 and upper piece 16 of a vertical member, both of which have circular cross-sections.

Figure 5:
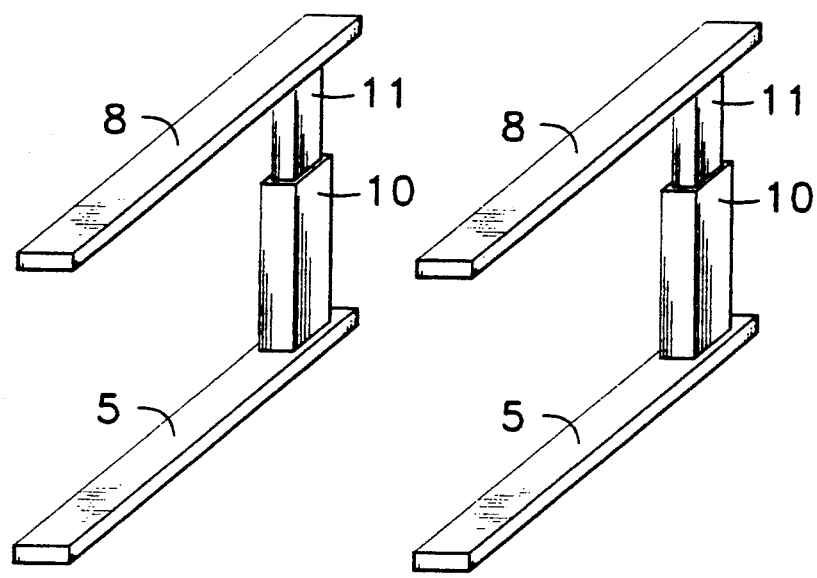
FIG. 5 is a perspective view of an embodiment with two base pieces, two platform pieces, and two telescoping vertical member means.

The alternative embodiment illustrated in FIG. 5 shows a perspective view of an embodiment with two base pieces 5, two lower pieces 10 of vertical members, each lower piece 10 affixed to one of the base pieces 5, two upper pieces 11 of the vertical members, each of which telescope with one lower piece 10, and two item supporting horizontal platform pieces 8, each of which is connected to one of the upper pieces 11. One advantage of this embodiment is that it uses less materials than the other disclosed embodiments.

Figure 6:
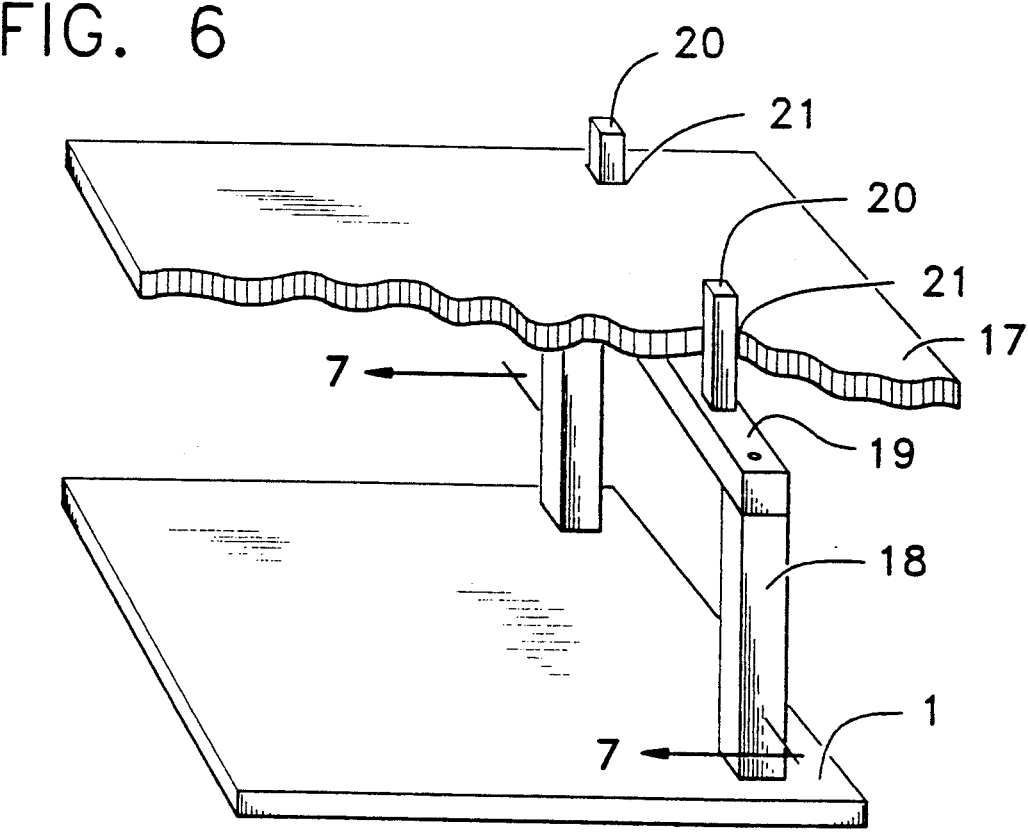
FIG. 6 is a perspective view of an embodiment with a vertical member assembly which includes a horizontal element, and a platform that includes two apertures.

The embodiment shown in FIG. 6 is a perspective view of an embodiment with a vertical member assembly including two lower vertical elements 18 that are spaced apart and connected to a base 1, a horizontal element 19 that connects to the lower vertical elements 18, and two upper vertical elements 20 that are connected to the horizontal element 19. A platform 17 (shown cut away) includes two aperture means 21 that provide a close vertical sliding fit with upper vertical elements 20 when platform 17 is held at certain angles with respect to aperture means 21, and grip aperture means 21 at other angles, said gripping enhanced by weight upon platform 17.

Figure 7:
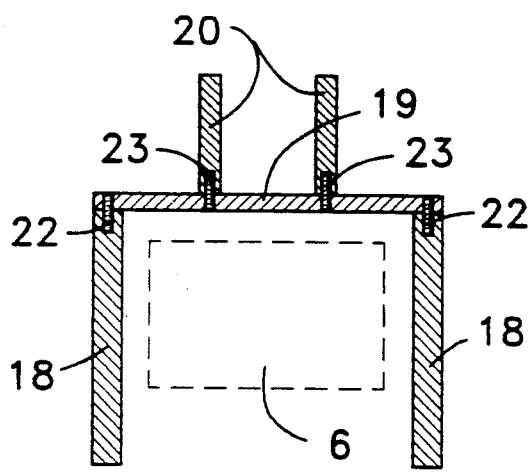
FIG. 7 is a cross sectional view through 7—7 of vertical member assembly of FIG. 6.

FIG. 7 is a cross sectional view through 7—7 of the vertical member assembly of FIG. 6. The rear protuberance 6 of a television set is shown in phantom. The horizontal element 19 is connected to the top of the lower vertical elements 18 with bolts 22. The upper vertical elements 20 are connected to the horizontal element 19 with bolts 23.

Figure 8:
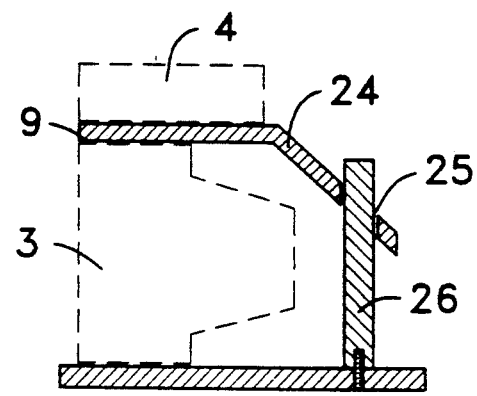
FIG. 8 is a cross sectional view of an embodiment with the rear portion of a platform slanting downward at an angle from the top surface of a television set.

FIG. 8 is a cross sectional view of an embodiment with the rear portion 24 of a platform slanting downward at an angle from the top surface 9 of television set 3 (as described in Disclosure Document No. 255707). In this embodiment, the slanted portion 24 includes a through hole 25 that provides a close sliding vertical fit with vertical member 26. The primary advantage of this embodiment is that the slant of the rear portion is such that the vertical member does not extend above the top surface 9 of the television set 3.

Figure 9:
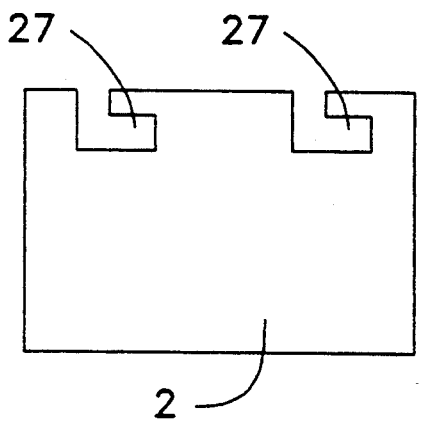
FIG. 9 is a view of the top surface of a platform with two rectangular shaped rear portions for engaging vertical members.
Figure 10:
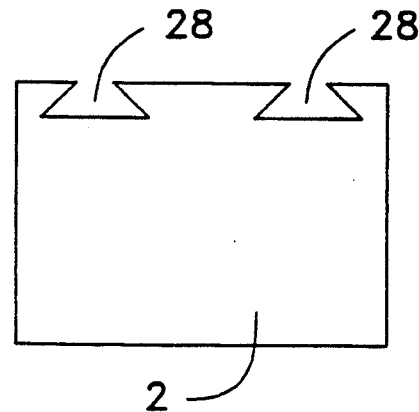
FIG. 10 is a view of the top surface of a platform with two triangular shaped rear portions for engaging vertical members.

FIG. 9 is a view of the top surface of a platform 2 with two rectangular shaped rear portions 27 that extend from the rear edge for engaging vertical members 26. FIG. 10 is also a view of the top surface of platform 2 with two triangular shaped rear portions 28 for engaging vertical members 26. These rear portions are described in Disclosure Document No. 257196. Vertical members 26 have a shape and dimensions that provide a close sliding fit with shaped portions 27 and 28.

The drawings can also be used to illustrate the invention in use with a video monitor and computer accessory (such as a computer printer). To do so, simply replace the television set 3 by a video monitor, and replace the VCR 4 by a computer accessory.

The above disclosed invention has a number of particular features which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A holder apparatus for positioning an item above an appliance, which comprises:
    a) a substantially flat, horizontal base portion having an upper surface and a lower surface;
    b) the appliance having a bottom, top, front, rear and sides, the bottom of the appliance supported upon the upper surface of the horizontal base portion;
    c) a substantially horizontal platform having an upper surface and a lower surface, with the upper surface sized to support said item thereon;
    d) two substantially vertical base members with one end of each vertical base member secured to the base portion and the opposite end of each vertical base member extending upward from the base portion to a height less than the height of the appliance; and two substantially vertical platform members with one end of each platform member secured to the platform and the opposite end of each vertical platform member extending downward from said platform to a height less than the height of the appliance, said platform members sized to be aligned with and closely received in said vertical base members adjustably positioning the platform, with at least a portion of the lower surface of the platform resting upon the top portion of the appliance, and to support the item upon the upper surface of the platform in a substantially horizontal position.

2. The apparatus of claim 1, wherein the appliance is a video display instrument.

3. The apparatus of claim 1, wherein the item is a video cassette recorder.

4. The apparatus of claim 1, in which said two vertical base members and said two vertical platform members are each aligned in proximity to the rear of the base portion, and positioned in spaced relation on opposite sides of a protuberance extending from the rear of the appliance.

* * * * *